United States Patent
Smith et al.

(10) Patent No.: US 6,389,068 B1
(45) Date of Patent: May 14, 2002

(54) SLICED BANDWIDTH DISTORTION PREDICTION

(75) Inventors: Patrick D. Smith, Deerfield; Robert G. Uskali, Schaumburg, both of IL (US); Michael J. Cooper, Marietta, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/571,068

(22) Filed: May 15, 2000

(51) Int. Cl.[7] ............................. H04B 3/46; H04B 3/30
(52) U.S. Cl. ...................... 375/225; 375/219; 375/285; 375/346; 370/468
(58) Field of Search ................................. 375/219, 222, 375/224, 225, 226, 228, 254, 257, 285, 346, 348; 455/63; 370/465, 468, 477

(56) References Cited

U.S. PATENT DOCUMENTS

| | | | | |
|---|---|---|---|---|
| 3,864,632 A | * | 2/1975 | Chang | 365/230 |
| 4,481,645 A | * | 11/1984 | Karabinis | 375/285 |
| 5,479,447 A | * | 12/1995 | Chow et al. | 375/260 |
| 5,825,829 A | * | 10/1998 | Borazjani et al. | 375/308 |
| 5,838,740 A | * | 11/1998 | Kallman et al. | 375/346 |
| 5,901,185 A | * | 5/1999 | Hassan | 375/346 |
| 6,032,019 A | * | 2/2000 | Chen et al. | 725/124 |
| 6,144,696 A | * | 11/2000 | Shively et al. | 375/222 |
| 6,212,229 B1 | * | 4/2001 | Salinger | 375/224 |

OTHER PUBLICATIONS

Pub. No.: 2001/0001007 A1, Pub. Date: May 10, 2001.*

* cited by examiner

*Primary Examiner*—Young T. Tse
(74) *Attorney, Agent, or Firm*—Romi N. Bose

(57) ABSTRACT

A method, and apparatus for performing the method, the method consists of the steps of: estimating a time when a dominant channel distortion occurs for each of a plurality of received test signals, wherein each of the plurality of received test signals occupies a different position in frequency in a communications medium having a given bandwidth; determining a differential group delay for the times estimated for each of the plurality of received test signals; and approximating a phase distortion of the communications medium as the differential group delay. In a variation, the method further consists of the steps of: estimating a power of each of the plurality of received test signals; determining an amplitude ripple by evaluating the power of each of the plurality of received test signals; and approximating an amplitude distortion of the communications medium as the amplitude ripple.

33 Claims, 4 Drawing Sheets

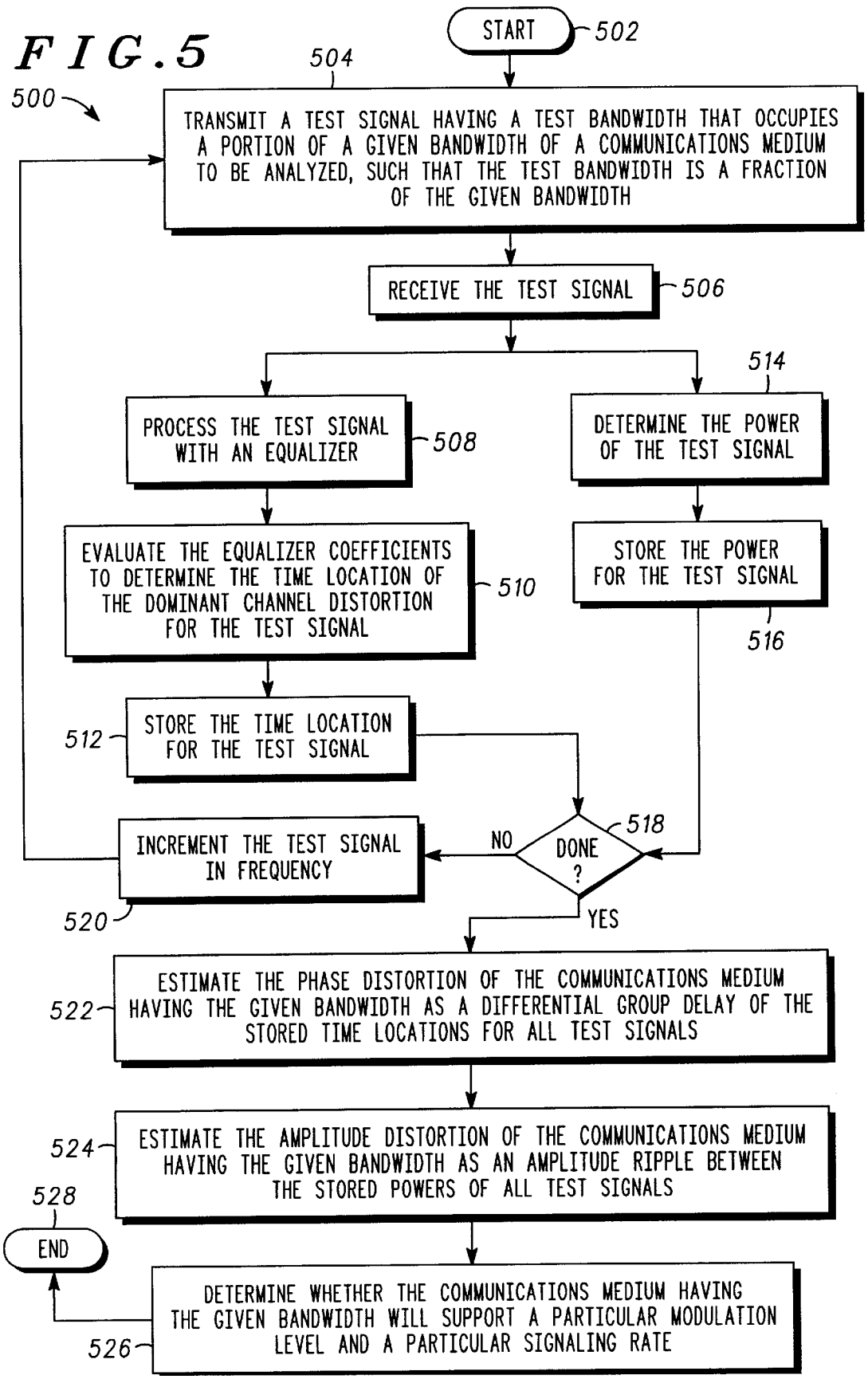

SLICED BANDWIDTH DISTORTION PREDICTION

FIELD OF THE INVENTION

The present invention relates channel distortion estimation, and more specifically to channel distortion estimation of a communications medium of communications system. Even more specifically, the present invention relates to amplitude and phase distortion estimation of a communications medium of a relatively time-invariant communications system.

BACKGROUND OF THE INVENTION

In a communications system, signals comprising data are typically transmitted from a transmitter to a receiver via a communications medium or communications channel contained within a communications link. The transmitter modulates and transmits these signals at a specified modulation type (e.g. QPSK, 16-QAM, and 64-QAM) and at a specified data or signaling rate (e.g. 160 k bits per second) within the communications medium. Typically, the communications medium (also referred to simply as a medium) has a particular range of frequencies or bandwidth, such as from 5 MHZ to 42 MHZ, that the signals travel at over the communications link. Additionally, the medium also refers to the physical path which the signal travels over from a transmitter to a receiver.

As these data-bearing signals propagate over the medium of the communications link, the signals experience distortion such that the signals being received at a corresponding receiver are altered from their transmitted form depending on noise levels, non-linearities, time delays and reflections that are all frequency and medium dependent upon the signals within the medium, for example. Specifically, the amplitude and phase of the signals are distorted, which is referred to in the composite as medium dependent channel distortion (also referred to as "channel distortion". If the channel distortion of signaling over a particular medium is within an acceptable bit error rate, for example, the receiver demodulates the signal and extracts the data from the signal. Disadvantageously, if the channel distortion is too great or is above an acceptable bit error rate, the receiver will demodulate the signals and potentially misinterpret the information or data carried therein.

Knowledge of the individual components of the channel distortion, i.e. the amplitude distortion component and the phase distortion component, for a given medium provides the transfer function of the medium. The transfer function is commonly defined as the ratio of the output to the input of the system as a function of frequency, where the altered output as related to the input is commonly degraded due to medium dependent channel distortion.

In a relatively time-invariant communications system, i.e. the transmitter and the receiver are relatively fixed in location with respect to one another, it is advantageous to know the transfer function (i.e. the amplitude distortion and the phase distortion) of a particular medium of a communication link. With such knowledge, persons skilled in the art may make determinations as to the specific types of signaling that the particular medium may support. For example, it can be determined what SNR (Signal-to-Noise) capability or grades of service, i.e. what modulation levels and signaling rates, are supportable by the medium. Additionally, it can be determined whether a specific fixed rate transmitter and corresponding fixed rate receiver, each configured for a certain modulation level and signaling rate, will be supported by a particular medium. Furthermore, it may be desirable to determine if a medium that is currently used by a transmitter and receiver sending signals at a specified modulation level and signaling rate could support signals at a higher or lower modulation level and a higher or lower signaling rate. Thus, it is desirable to determine the transfer function of a given medium.

Currently, in order to determine whether a particular medium may support signals at a specified modulation level and signaling level, a transmitter and a receiver that send test signals at the specified modulation level and signaling rate are connected in the communications path and tested. Disadvantageously, this approach is not desired since the devices must be physically connected in the communications path. This may be time consuming and inefficient, for example, if the transmitter and receiver are located physically at a distance from each other, or if one of the transmitter or receiver is located within a subscriber's residence. Furthermore, if the medium already is used to provide an existing service, for example, to a subscriber, the existing service would have to be interrupted for the duration of the testing of the medium. This may further serve to inconvenience or irritate the subscriber using the existing service.

Alternatively, an adaptive bandwidth and signaling rate scan receiver may be used in the communications path that can switch between higher and lower modulation levels and signaling rates. The HP89441 VSA (Vector Signal Analyzer), made by Hewlett Packard, is an example of such a device. Likewise, an adaptive test signal source that transmits the test signals is needed at the transmit side. Thus, fixed bandwidth and signaling rate transmitters and receivers must be replaced by expensive adaptive transmitters and receivers. Again, such dedicated adaptive equipment must be connected in the communications path and could inconvenience subscribers, as well as interrupt any existing services provided over the medium for the duration of the testing. Such adaptive equipment may already exist in the communications path; however, such equipment is very costly and inefficient.

Additionally, in order to test the medium, the test signaling transmitted over the medium by the dedicated equipment, whether adaptive or not, occupies the entire bandwidth of interest, i.e. occupies the entire medium having a given bandwidth. Disadvantageously, in a system including adaptive equipment, since the test signals occupy the entire medium under test, there may be a loss of throughput of an existing service being provided over the medium, even though additional equipment is not required because the existing equipment is adaptive.

Furthermore, with regard to estimating a transfer function of the medium, and since the test signals are transmitted over the entire spectrum of the medium being tested, the measured signal at the receiver provides a gross channel distortion estimate of the medium. This gross channel distortion estimate is inherently difficult, if not impossible, to separate into the individual components of the phase distortion and the amplitude distortion that are required for the transfer function. Thus, connecting dedicated equipment, whether adaptive or not, does not allow the estimation of the transfer function of the medium.

Thus, since the transfer function of the medium is not determined, the medium must be tested at each modulation level and signaling rate of interest to see what levels or grades of service the medium will support. In contrast, if the transfer function is known, the modulation levels and signaling rates supportable by a particular medium may be determined using known signal processing simulations, such as "SPW" designed by Cadence or "System View by Elanix" designed by Elanix, Inc.

Alternatively, other techniques may be used to determine the transfer function of a particular medium, for example, by using a network analyzer. A network analyzer is a two-port system that must be coupled to the transmit and receive end of the communications path. Once connected, the network analyzer sends test signals over small frequency portions of the medium to be tested. The receiver end measures and records amplitude and phase differences as viewed from the received sine wave in comparison to the transmitted sine wave and then analyzes these amplitude and phase relationships over the frequency range of the communications medium. Disadvantageously, again an existing service using the medium must be interrupted during the duration of the testing. Furthermore, since the network analyzer is a two-port system, both the transmit and receive end of the communications path must be coupled to the network analyzer. In communication s systems in which the transmit and receive ends are physically located at a distance from each, e.g. in a hybrid fiber/cable (HFC) system in which the communication medium may be on fiber and cable from the subscriber to a headend, it is impractical to string additional testing cables reaching many miles to attach both the transmit and receive end to the network analyzer.

Thus, a technique is needed to test a particular medium to estimate the phase and amplitude distortion of the particular medium, i.e. determine its transfer function, which can be used to interpolate what grades of service, i.e. modulation levels and signaling rates, are supportable by the particular medium without obtrusive test signaling that interrupts existing services or requiring dedicated equipment, such as adaptive transmitters and receivers, in the communications path.

BRIEF DESCRIPTION OF THE DRAWINGS

The above and other aspects, features and advantages of the present invention will be more apparent from the following more particular description thereof, presented in conjunction with the following drawings wherein:

FIG. 5 is a flowchart of the steps performed in one embodiment of the present invention for estimating the amplitude distortion and the phase distortion of the communications medium of FIG. 1.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

A method and apparatus for the estimation of a phase distortion and an amplitude distortion of a communications medium having a given bandwidth is described herein.

In one embodiment, the invention may be characterized as a method, and a corresponding system for performing the method, of estimating the phase distortion of a communications medium, the method comprising the steps of: estimating a time when a dominant channel distortion occurs for each of a plurality of received test signals, wherein each of the plurality of received test signals occupies a different position in frequency in the communications medium having the given bandwidth; determining a differential group delay for the times estimated for each of the plurality of received test signals; and approximating the phase distortion of the communications medium as the differential group delay.

In another embodiment, the invention may be characterized as a method, and a corresponding system for performing the method, of estimating the amplitude distortion of a communications medium, the method comprising the steps of: estimating a power of each of a plurality of received test signals, wherein each of the plurality of received test signals occupies a different position in frequency in the communications medium having the given bandwidth; determining an amplitude ripple by evaluating the power estimated for each of the plurality of received test signals relative to a reference point; and approximating the amplitude distortion of the communications medium as the amplitude ripple.

In further embodiments, the methods and apparatus described herein may be used in the estimation of the transfer function of a particular communications medium. This transfer function is then used to interpolate or predict what levels or grades of service, i.e. what modulation levels and signaling rates, are supportable by the communications medium. Advantageously, the embodied methods of the invention that are described are able to be carried out without connecting dedicated equipment to the communications medium or obtrusively interrupting existing services on the communications medium; thus, providing an in-system solution. Further advantageously, fixed bandwidth and signaling rate receivers may be used to perform the embodied methods of the invention.

Figure 1:
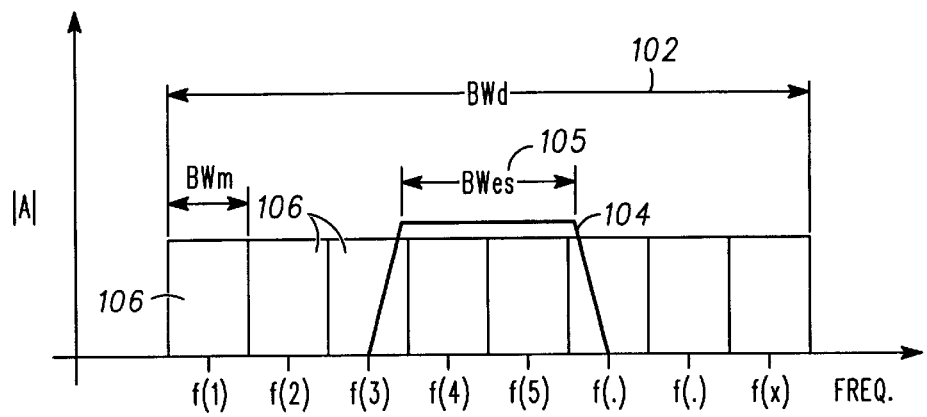
FIG. 1 is an amplitude vs. frequency plot of a communications medium of a relatively time-invariant communications link in accordance with one embodiment of the present invention illustrating the frequency span (or bandwidth) of the communications medium to be tested in relation to an existing service and sliced bandwidth test signals occupying the frequency span of the communications medium which are used for estimating or predicting the amplitude and phase distortion of the communications medium.

Referring first to FIG. 1, an amplitude vs. frequency plot is shown of a communications medium of a relatively time-invariant communications link in accordance with one embodiment of the present invention illustrating the frequency span (or bandwidth) of the communication medium to be tested in relation to an existing service and sliced bandwidth test signals occupying the frequency span of the communications medium which are used for estimating or predicting the amplitude and phase distortion of the communications medium. Shown is a given bandwidth 102 (also referred to frequency span) defined as $Bw_d$ of a communications medium (also referred to a communications channel or simply "medium" and "channel") to be tested. Also shown is an existing service 104 having a service bandwidth 105, shown as $BW_{es}$, and several test bandwidths 106 shown as $BW_m$ within which test signals reside.

In practice, the communications medium is typically wideband, for example, the communications medium has a bandwidth $BW_d$ 102 between 5 MHz and 42 MHz. The communications medium has a frequency range or spectral region (i.e., given bandwidth 102) within which signaling (e.g. existing service 104) is sent within a communications link, such as a wireline link (e.g. cable or fiber) or a wireless link (e.g. microwave radio link). As described above, the communications medium will unintentionally introduce medium dependent channel distortion (hereinafter referred to simply as "channel distortion") to the signaling sent within the communications medium. This channel distortion may be caused by multipaths due to reflections of the signaling within the communications medium 102, as well as the effect of non-linearities and noise contributions of devices such as amplifiers, filters, etc., coupled with ingress noise sources introduced into the medium over a given bandwidth in the communications path. Channel distortion is a well understood concept in the art of communications. The channel distortion results in both a phase distortion and an amplitude distortion of the signal having been received at the receiver end of the communications medium.

The channel distortion affects the levels or grade, or SNR (Signal-to-Noise) capability, of signaling that can be supported by the communications medium. For example, depending on the channel distortion of the communications medium, the communications medium may be able to support signaling at one modulation level and signaling rate, but not at another modulation level and signaling rate. For example, a given communications medium having a given bandwidth 102 of spectra may be able to support signaling at lower data rates or signaling rates at higher modulation levels, i.e. 16-QAM at 160 kbaud, but may not be able to tolerate a quadrupled rate signal at a lower modulation level, i.e. QPSK at 640 kbaud. Thus, it is advantageous to quantitatively determine a given communications medium's viability for a given signaling rate and modulation level. Additionally, it is advantageous to quantitatively determine or estimate the highest level of service, i.e. the highest modulation level and highest signaling rate, that is supportable by the given communications medium.

Without actually connecting dedicated equipment to the communications path and using the communications medium at the desired signaling rate and modulation level, in order to determine whether a given communications medium will support a particular modulation level and signaling rate, the amplitude and phase distortion components of the communications medium must be known. The amplitude distortion and the phase distortion provide the transfer function of the communications medium, i.e. the ratio of the output to the input of a system as a function of frequency. Then, knowing the transfer function, conventional signal processing simulators, such as "System View by Elanix" developed by Elanix, Inc. of Westlake Village, Calif. or "SPW" developed by Cadence Design Systems, Inc. of San Jose, Calif., or mathematically based theoretical limits that can be worked out with pencil and paper are used to quantitatively determine if the particular communications medium will support a given signaling rate and a given modulation level. Those skilled in the art will recognize many possible ways to quantitatively determine acceptable limits for a particular communication link design.

In one embodiment of the present invention, test signals are sent from the transmitter to the receiver over the communications medium. Advantageously, these test signals are sent by the existing, in-system transmitters and receivers communicating at a specified modulation level and signaling rate. These test signals have a test bandwidth 106, $BW_m$, that is a fraction of the bandwidth $BW_d$ 102 of the communications medium. Thus, the test signals have a test bandwidth $BW_m$ 106 that is a narrowband slice of the bandwidth 102 of the communications medium. It is noted that the bandwidth $BW_d$ 102 is not necessarily the highest rate bandwidth of the communications medium. Each test signal is transmitted over the communications medium and occupies a different position in frequency of the bandwidth $BW_d$ 102 of the communications medium. As shown in FIG. 1, each test signal occupies a different portion of the bandwidth $BW_d$ 102 without overlapping the test bandwidth 106 of adjacent test signals, and in combination, all of the test signals cover the entire bandwidth $BW_d$ 102 of the communications medium that is being investigated.

However, in a variation of this embodiment, the test signals may be configured to overlap each other such that one test signal occupies part of the same test bandwidth 106 as an adjacent test signal. For example, the test signal having a test bandwidth 106 centered at f(1) may overlap half of the test bandwidth 106 of the test signal centered at f(2), and the test signal having a test bandwidth 106 centered at f(2) may overlap half of the test bandwidth 106 of the test signal centered at f(3), and so on. This example results in a doubling of the number of measurement points within the bandwidth $BW_d$, resulting in higher resolution results, which are described more specifically with reference to FIGS. 2–5. As such, in this variation, the degrees of freedom of the test signals' center frequency may be left open so that the spacing of the test signals can overlap for more frequency resolution or be spaced further apart in frequency for less resolution.

Furthermore, each test signal having a test bandwidth $BW_m$ is transmitted separately in time, with a time delay in between test signals. This is a departure from prior art techniques that send a test signal that has the same bandwidth as the bandwidth $BW_d$ 102 of the communications medium, i.e. $BW_m=BW_d$, at one time. This embodiment transmits test signals separately in time that are narrowband slices of the bandwidth 102 of the communications medium (e.g., each test signal occupies a different position in frequency within the communications medium having the bandwidth $BW_d$), such that when all test signals are taken together, substantially every portion of (or a majority of) the bandwidth $BW_d$ 102 of the communications medium is covered by at least one test signal (depending on the overlap or degrees of freedom of the test signals).

At the receive end (e.g. at a receiver), measurements are taken for each test signal and are stored. These measurements are the time location of the dominant channel distortion for each test signal and the power (or amplitude) of each test signal. The measurements for all of the individual test signals, each occupying a different portion of the bandwidth $BW_d$ 102 (or a different position in frequency in the communications medium), but collectively spanning the entire bandwidth $BW_d$, are then used to interpolate or predict both the phase distortion and the amplitude distortion of the communications medium having bandwidth $BW_d$ 102. These details are further described with reference to FIGS. 2–5.

This is a departure from the known prior art where a test signal is sent that has a test bandwidth $BW_m$ equal to the bandwidth $BW_d$ of the communications medium. This conventional test signal will yield at best a composite channel distortion level, which will be inherently difficult, if not impossible, to separate the individual phase and amplitude distortions needed to determine the transfer function.

Advantageously, in this embodiment of the invention, since the test signals each have a test bandwidth $BW_m$ 106 that is a fraction of, or a narrowband slice of, the bandwidth $BW_d$ 102 of the communications medium to be evaluated, the time location of the dominant channel distortion and power level (or amplitude) of each test signal is able to be accurately estimated. With regard to the test bandwidth $BW_m$ 106, as the test bandwidth 106 decreases, the accuracy of an amplitude estimate increases; however, the accuracy of a phase estimate decreases (assuming a fixed coefficient equalizer). Also, the converse of this relationship is true such that as the test bandwidth 106 increases, the accuracy of an amplitude estimate decreases; however, the accuracy of a phase estimate increases. Thus, the chosen test bandwidth $BW_m$ 106 is a compromise that is selected in order to yield an accurate amplitude estimate with minimal calibration of the receiver (so that the power or amplitude of a test signal can be accurately estimated) and an accurate phase estimate for each test signal (so at the time location of the dominant channel distortion for a test signal can be accurately estimated).

In an embodiment involving a hybrid fiber/cable (HFC) system, such as described with reference to FIG. 6, it has been determined that the ration of the test bandwidth $BW_m$ 106 to the bandwidth $BW_d$ 102 of the communications medium should be at least 1:5. In other words, the test bandwidth $BW_m$ 106 should be less than or equal to 20% of the given bandwidth $BW_d$ 102 of the communications medium. For example, if the bandwidth $BW_d$ of the communications medium is 40 MHz, then the test bandwidth $BW_m$ should be at most 8 MHz, and preferably less than 8 MHz. It is noted that in the hybrid fiber/cable embodiment or other embodiments, it may prove advantageous that this ratio of the test bandwidth to the bandwidth may not be limited to at least 1:5, and may be less than 1:5 as determined by the fidelity requirements for the given bandwidth measurement resolution desired. Furthermore, as illustrated in FIG. 1, in some embodiments, the test signals may be transmitted over the communications medium without interrupting the existing service 104 having a service bandwidth 105 provided by a service provider. For example, the test signal having a test bandwidth 106 centered around f(1) can be transmitted without interruption whatsoever to the existing service 104 since both occupy separate spectral portions of the bandwidth $BW_d$ 102. Additionally, when the test signal having a test bandwidth 106 is centered around, for example, f(3) (or f(4)) is transmitted, the existing service 104 may simply be "moved" to another spectral portion of the bandwidth $BW_d$ 102 of the communications medium (e.g., the service bandwidth 105 is moved) such that no interruption of the existing service 104 occurs. Thus, the transmitter simply transmits the existing service 104 within a different portion of the bandwidth $BW_d$ (i.e., a different position in frequency within the communications medium) and the receiver is tuned so as to receive the existing service 104 at the different portion.

Alternatively, in other embodiments, instead of moving the existing service 104, simple one carrier algorithms may be developed to time multiplex the existing service 104 with the test signal (e.g. the test signal having a test bandwidth 106 centered around f(3)) at rates that allow the throughput of the existing service 104 to not be seriously degraded. Typically, the test signal is a pseudo random binary sequence (PRBS) and has a duration of 20 μsec, for example. As such, the receiver might miss a packet from the existing service 104 due to the test signal. As is known in the art, the missing packet is simply re-transmitted to the receiver. Thus, whether the existing service 104 is moved or the test signal is time multiplexed into the existing service 104, the existing service 104 is not obtrusively interrupted by the test signals. In another variation, the existing service 104 may be temporarily suspended for the duration of the test signal, e.g. for less than 1 msec.

Alternatively, the test signal may be a valid data carrying signal. For example, in communications systems such as a hybrid fiber/cable (HFC) system, such as described with reference to FIG. 6, the test signals may carry data since such a system has multiple bandwidths (i.e. multiple signaling rates) with which it can communicate and remain within protocol. For example, the test signal may contain the data of the existing service; however, it is transmitted at a different data rate than the remainder of the existing service (e.g. the test signal may be sent at a slower data rate than the existing service). This test signal is time multiplexed in with the existing service. For example, the test signal centered at f(3) may be the existing service, but transmitted at a slower signaling rate. Thus, since the existing service and the test signal are sent at different rates, the receiver can distinguish between them and make the appropriate estimations (i.e. time location of the largest channel distortion and power or amplitude) from the test signal (which happens to be carrying data). This is a departure from the prior art test signals that are random sequences or test sequences, since the test signal of this embodiment is actually used for carrying data. The selected signaling rate for the particular test signal will not significantly degrade the throughput of the existing service. Advantageously, the existing service does not have to be "moved" or interrupted at all, it is only slightly delayed for the duration of the test signal.

Furthermore, since each test signal 106 is sent separately in time and at different positions in frequency in the communications medium, it is unimportant which order the test signals are sent. For example, the test signals having test bandwidths 106 centered around f(1), f(2), f(3), etc., may be sent in sequential incremental frequency order. Alternatively, these test signals may be sent such that a test signal having a test bandwidth 106 centered at f(3) is sent first, then a test signal 106 centered around f(1), then a test signal centered at f(x), and so on. Thus, it is not important the order in which the test signals are sent, but that the transmitted test signals cover every spectral portion of the bandwidth $BW_d$ 102 of the communications medium.

Figure 2:
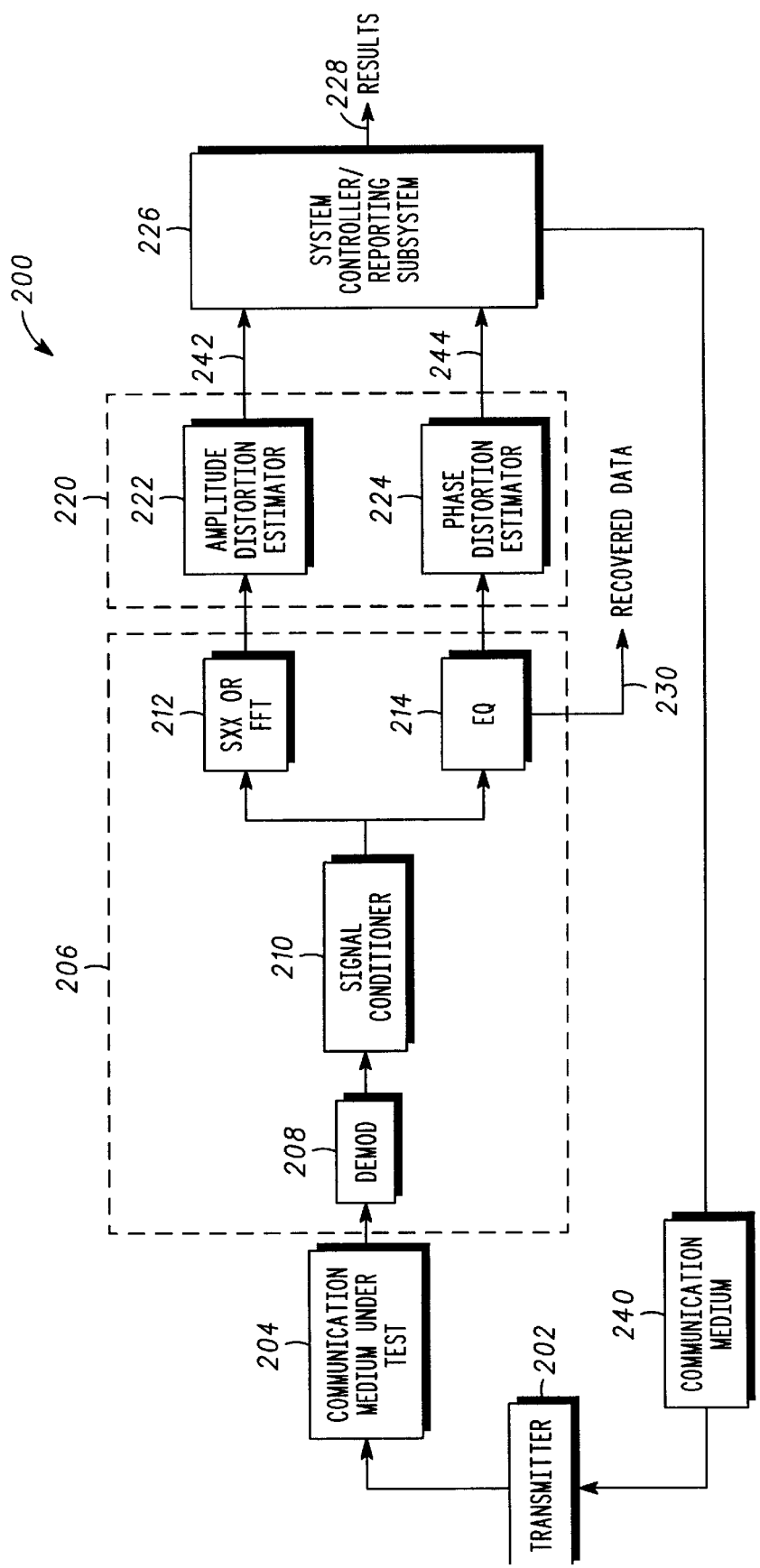
FIG. 2 is a block diagram of one embodiment of a system for estimating or predicting the amplitude and phase distortion present, for example, over the communications medium of FIG. 1.

Referring next to FIG. 2, a block diagram is shown of one embodiment of a system for estimating or predicting the amplitude and phase distortion, for example, over the communications medium of FIG. 1. Shown are a transmitter 202, a communications medium 204 to be tested, and a receiver 206. The receiver 206 includes a demodulator 208, a signal conditioner 210, an equalizer 214, and an autocorrelator 212 (or a Fast Fourier Transform 212 or other power estimating algorithms or hardware such as wavelets, peak detectors, and code weights, for example), and recovered data 230. Also shown are a channel distortion estimator 220 comprising an amplitude distortion estimator 222 and a phase distortion estimator 224, a system controller/reporting subsystem 226, results 228, and a communications medium 240.

Furthermore, while referring to FIG. 2, concurrent reference will be made to the steps of FIG. 5, which is a flowchart of the steps that may be performed by the system of FIG. 2 in one embodiment of the present invention for estimating the amplitude distortion and the phase distortion of the communications medium 204.

As illustrated in FIG. 2, the transmitter 202 is coupled to the receiver 206 via the communications medium 204 having a given bandwidth (i.e., bandwidth 102) that is being tested. The communications medium 204 that is being evaluated or tested is a wide band in frequency having of bandwidth $BW_d$ 102 over a relatively time-invariant communications link, such as a wireline communications link (e.g. cable or fiber), a fixed location point to point wireless microwave communications link (e.g. microwave), or even a geosynchronous satellite wireless communications link in which there is relatively little movement between the transmitter 202 and the receiver 206. For example, the communications medium 204 may comprise a piece of spectrum from 5 MHZ to 42 MHZ.

Advantageously, the transmitter 202 is a fixed signaling rate and modulation level transmitter 202, although this embodiment of the invention is applicable to adaptive transmitters that can switch between multiple signaling rates and multiple modulation levels. Furthermore, the receiver 206 is a fixed signaling rate and fixed modulation level receiver, although, again, this embodiment also applies to adaptive receivers that can switch between multiple signaling rates and multiple modulation levels. As will be shown, by using fixed rate and modulation transmitters 202 and receivers 206, this embodiment of the present invention may be used to extrapolate or predict the communications medium's 204 ability to support signaling at another signaling rate and modulation level that the existing fixed rate transmitter 202 and receiver 206 do not provide. Thus, the communications medium 204 can be tested for to determine whether the communications medium 204 will support signaling that the existing equipment does not provide without having to connect dedicated equipment that can provide such signaling.

As described above, transmission of signals through the communications medium 204 results in the both phase and amplitude distortion of the transmitted signal. The phase and amplitude distortion define the transfer function of the communications medium 204, which is initially unknown. As is known in the art, different communications mediums each have specific transfer functions associated therewith. For example, communications medium 204 has a specific transfer function $H_1(\omega)$, that may be different than the transfer function of another communications medium. Discovering the transfer function $H_1(\omega)$ for a particular communications medium 204 enables the determination of whether the communications medium 102 will support particular grades of service, i.e. particular modulation levels and particular signaling rates.

In practice, the process begins at step 502 of FIG. 5. A test signal having a test bandwidth $BW_m$ (e.g. test bandwidth $BW_m$ 106 of FIG. 1) that is a fraction of, or a narrowband slice of, the bandwidth $BW_d$ 102 of the communications medium 204, is individually transmitted from the transmitter 202 to the receiver 206 via the communications medium 204 (Step 504 of FIG. 5). Note that a system controller, such as the system controller/reporting system 226, which is located at or is coupled to the receiver 206, may provide the instructions to transmit the test signal. This test signal is received at the receiver 206 (Step 506 of FIG. 5). The test signal occupies a different spectral portion of the bandwidth $BW_d$ 102 of the communications medium 204 compared to subsequently or previously transmitted test signals. Furthermore, as discussed above, the test signal is sent in such a manner that it does not interrupt any existing services (e.g. existing service 104 of FIG. 1). As such, the receiver 206 is discussed as receiving only the test signal, since the receipt and treatment of the existing service (if present within the communications medium 204) is well known in the art.

Thus, a test signal is digitally modulated and transmitted from the transmitter 202 to the receiver 206 via the communications medium 204. The demodulator 208 receives the digitally modulated test signal (or alternatively, an analog test signal having been received and digitized depending on the communications link and the equipment of the system) and provides a demodulated output to the signal conditioner 210. The signal conditioner 210 typically applies signal processing such as filtering and DC tracking. The signal conditioner 210 may be practiced according to known signal processing techniques, such as analog signal processing or digital signal processing. Note that the receiver 206 may introduce further distortion in the received signal which is usually due to filtering at the signal conditioner 210, and is referred to as the receiver transfer function $H_2(\omega)$. In some cases, low distortion receivers may be implemented in which case, the receiver transfer function $H_2(\omega)$ can be ignored.

The output of the signal conditioner 210 is then sent to an equalizer 214 and also to an autocorrelator 212 (or a Fast Fourier Transform 212, also referred to as FFT 212 or other power estimating algorithms or hardware such as wavelets, peak detectors, and code weights). At the equalizer 214, the equalizer attempts to construct an inverse transfer function of the received signal such that intersymbol interference (ISI) can be removed and recovered data 230 can be extracted and output. The equalizer 214 is entirely conventional and includes N taps (e.g. 8 taps) that are used by the equalizer 214 to generate and store coefficients, also known as tap weights, so that the equalizer 214 can produce the recovered data 230 at its output. Thus, the equalizer solution is the inverse transfer function of the test signal. For example, the equalizer solution or the inverse transfer function is defined as $H_A^*(\omega)$ which is the conjugate of the system transfer function $H_A(\omega)$ for the test signal, where $H_A(\omega)=H_1(\omega)H_2(\omega)$. The equalizer 214 will typically calibrate for the receiver transfer function $H_2(\omega)$, or in the case of a low distortion receiver, will ignore it. The output of the equalizer 214 is the recovered data 230 (which may be the test signal, either a PRBS or other data, or data from an existing service). Therefore, the output of the signal conditioner 210, e.g. the demodulated and conditioned test signal is processed with an equalizer 214 (Step 508 of FIG. 5). Thus far, the structure and functionality of the receiver 206 including the demodulator 208, the signal conditioner 210, and the equalizer 214 is entirely conventional.

In this embodiment of the present invention, and in contrast to the prior art, a phase distortion estimator 224 is coupled to the equalizer 214 to access the stored equalizer coefficients. As is common in equalizers 214, there are N taps as a function of time and at a spacing of T or T/integer, where T is the symbol period of the test signal. For a NT or T/N equalizer, N is the number of equalizer taps. The phase distortion estimator 224 evaluates the equalizer coefficients for each test signal to determine the time location of the dominant channel distortion, also referred to as the highest magnitude micro-reflection, for the particular test signal (Step 510 of FIG. 5). Thus, the phase distortion estimator 224 looks for the highest value equalizer coefficient (which corresponds to the dominant channel distortion) and then knowing the spacing between equalizer taps (either TN or T/N), determines the time location of the dominant channel distortion relative to the first receipt of the test signal, defined as □T(f(x))□. It should be noted that the choice of NT or T/integer equalizer topologies should be customized for discrimination of the highest level modulation or frequency bandwidth that is under analysis.

This time location □T(f(1))□ derived from the set of coefficients is then stored for each test signal (Step 512 of FIG. 5) that is received at the receiver 206 and processed at the equalizer 214.

In parallel to the steps performed at the equalizer 214, the output of the signal conditioner 210 is coupled to the autocorrelator 212, or alternatively the FFT 212 or other means to estimate the power of a signal as mentioned above. The autocorrelator 212 computes the power spectral density of the test signal, whereas the FFT 212 estimates the magnitude of the amplitude of the test signal, in either case, an estimation of the power of the test signal is determined (Step 514 of FIG. 5). The functionality and structure of the autocorrelator 212 and the FFT 212 are well known in the art.

Advantageously, the amplitude distortion estimator 222 is coupled to the autocorrelator 212 or the FFT 212. The amplitude distortion estimator 222 saves the value of the normalized power of the test signal or the normalized amplitude of the test signal which is the peak value at the autocorrelator 212 or the FFT 212, and is well known in the art. For example, the amplitude distortion estimator 222 stores the power of the test signal as □A(f(1))□ (Step 516 of FIG. 5).

Once the phase distortion estimator 224 stores the time location □T(f(1))□ (Step 512 of FIG. 5) and the amplitude distortion estimator 222 stores the power □A(f(1))□ of the test signal (Step 516 of FIG. 5), the system controller/reporting subsystem 226, which is coupled to both the amplitude distortion estimator 222 and the phase distortion estimator 224, sends a message via communications medium 240 back to the transmitter 202 to instruct the transmission of another test signal. Note that the communications medium 240 is typically a reverse path or upstream path of the communications link that also contains the communications medium 204 being tested. The next test signal, however, will have a test bandwidth $BW_m$ 106 that occupies a different portion of the bandwidth $BW_d$ 102 of the communications medium 204 (or a different position in frequency in the communications medium 204) than the earlier test signals, such as shown in FIG. 1. Thus, the next test signal is incremented in frequency (Step 520 of FIG. 5), e.g. the next test signal is sent as centered about f(2), instead of f(1) in FIG. 1. Furthermore, depending on the degrees of freedom or frequency spacing of the test signals, the next test signal centered at f(2) may or may not overlap the first test signal centered at f(1). Then, this next test signal is transmitted to the receiver 206 via the communications medium 204 that is being tested (Step 504 of FIG. 5).

This subsequent test signal is again, received at the receiver 206, e.g. sent through the demodulator 208, the signal conditioner 210, and then sent to both the autocorrelator 212 (or FFT 212) and to the equalizer 214. The phase distortion estimator 224 then evaluates the equalizer coefficients for the second test signal to determine and store the time location of the dominant channel distortion □T(f(2))□ for the second test signal. Likewise the amplitude distortion estimator 222 stores the normalized power or amplitude □A(f(2))□ of the second test signal. With reference to FIG. 5, steps 504 through 516 are repeated. Again, until test signals have been sent over the communications medium 204 such that every portion of spectrum of the communications medium 204 has been occupied by at least one test signal (Step 518 of FIG. 5), the test signals are incremented in frequency (Step 520 of FIG. 5) and transmitted from the transmitter 202 to the receiver 206 (Step 504 of FIG. 5).

Once every spectral portion (or substantially every portion or a majority) of the communications medium 204 has been covered by at least one test signal (Step 518 of FIG. 5), then the amplitude distortion estimator 222 and the phase distortion estimator 224 estimate or interpolate the individual amplitude and phase distortion components of the communications medium 204 itself based upon the individual times □T(f(1))□ through □T(f(x))□ and the individual powers or amplitudes □A(f(1))□ through □A(f(x))□ stored for the respective test signals. Table 1 below illustrates the values of □T(f(x))□ and □A(f(x))□ that are stored in the phase distortion estimator 224 and the amplitude distortion estimator 222, respectively, i.e. stored collectively in the channel distortion estimator 220. Additionally, depending on the degrees of freedom or frequency spacing of the test signals, the number of entries may vary in Table 1. For example, for higher resolution results such that the test signals overlap each other in frequency, there will be more entries in Table 1.

TABLE 1

| f(x) | □A(f(x))□ | □T(f(x))□ |
| --- | --- | --- |
| f(1) | □A(f(1))□ | □T(f(1))□ |
| f(2) | □A(f(2))□ | □T(f(2))□ |
| f(3) | □A(f(3))□ | □T(f(3))□ |
| f(4) | □A(f(4))□ | □T(f(4))□ |
| f(5) | □A(f(5))□ | □T(f(5))□ |
| f(.) | □A(f(.))□ | □T(f(.))□ |
| f(.) | □A(f(.))□ | □T(f(.))□ |
| f(n) | □A(f(n))□ | □T(f(n))□ |

Figure 3:
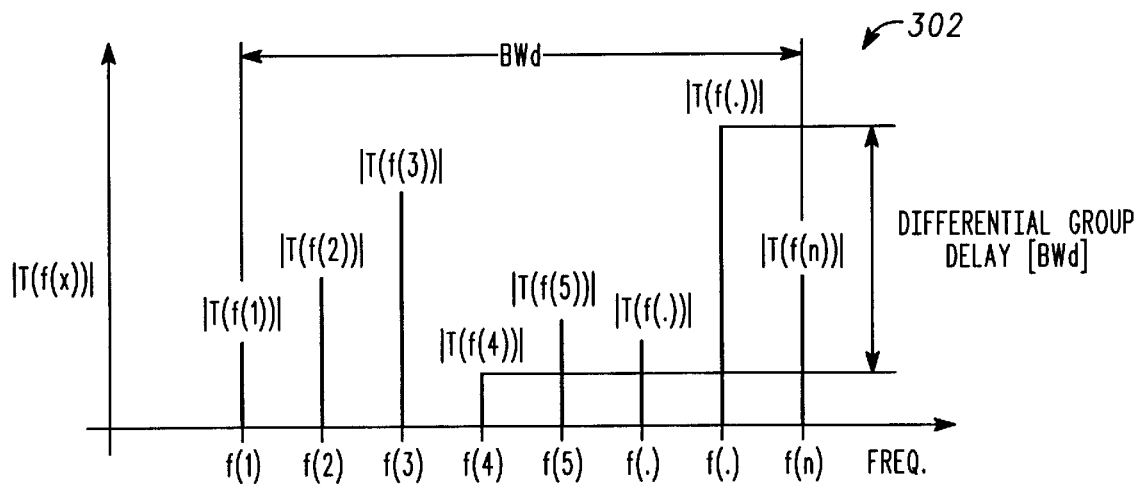
FIG. 3 is a time vs. frequency plot taken from the data determined by the system embodied in FIG. 2 and used to estimate the phase distortion of the communications medium of FIG. 1.

Next, referring briefly to FIG. 3, a time vs. frequency plot taken from the data determined by the system embodied in FIG. 2 is shown which is used to estimate the phase distortion of the communications medium 204. Thus, this time vs. frequency plot 302 is determined from the stored time locations □T(f(x))□ for each test signal as stored in Table 1. As is illustrated, the time location for the dominant channel distortion is plotted as a function of frequency at which each test signal is centered about. This information stored in Table 1 as □T(f(x))□ and graphically shown in FIG. 3 is used to determine the differential group delay between the time locations □T(f(x))□. The differential group delay is shown graphically as the difference in time between the smallest magnitude time location and the largest magnitude time location on the time vs. frequency plot 302 relative to a reference point. The reference point here is chosen as □T(f(x))□ equals zero. Alternatively, the time locations may be absolute values, i.e. values not relative to a reference point. Again, the higher the resolution, e.g. the test signals overlap in frequency, the more points are plotted in FIG. 3.

Advantageously, since the test bandwidth $BW_m$ 106 of each test signal is small compared to the bandwidth $BW_d$ 102 of the communications medium 204, it is assumed that the amplitude distortion of each respective test signal is negligible over the test signal's test bandwidth 106. Thus, any distortion present in each test signal is primarily due to a phase distortion, and not an amplitude distortion. Thus, the differential group delay, which is the time difference over frequency approximates the phase distortion of the communications medium 204 being tested. Therefore, the phase distortion estimator 224 estimates the phase distortion of the communications medium 204 as a differential group delay of the stored time locations for all of the test signals (Step 522 of FIG. 5). This approximated phase distortion is sent to the system controller/reporting subsystem 226 as output 244.

Figure 4:
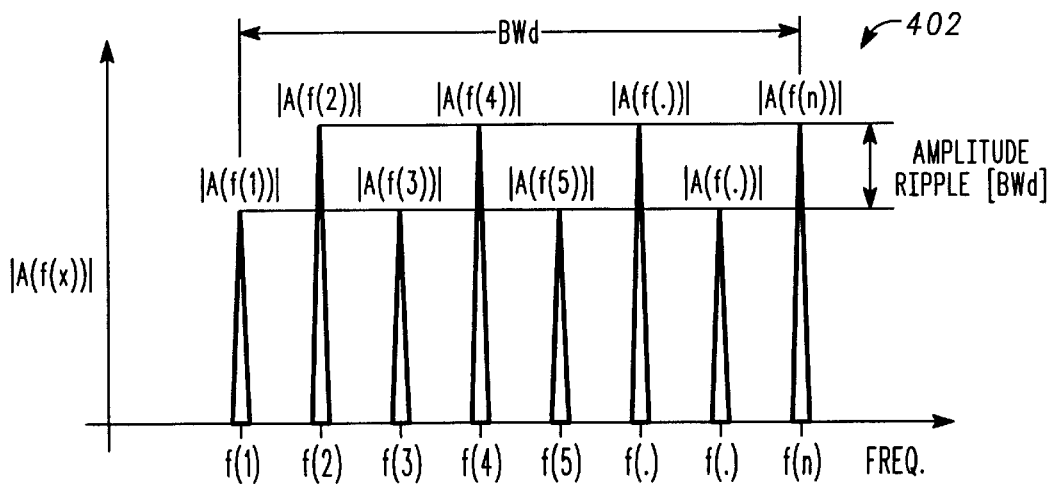
FIG. 4 is an amplitude vs. frequency plot taken from the data determined by the system embodied in FIG. 2 and used to estimate the amplitude distortion of the communications medium of FIG. 1.

Next, referring briefly to FIG. 4, an amplitude vs. frequency plot taken from the data determined by the system embodied in FIG. 2 is shown and which is used to estimate the amplitude distortion of the communications medium of FIG. 1. This amplitude vs. frequency plot 402 is determined from the stored powers or amplitudes □A(f(x))□ for each test signal as stored in Table 1. As is illustrated, the amplitudes of each test signal is plotted as a function of frequency at which each test signal is centered. Again, as the resolution of the process increases, e.g. test signals overlap in frequency with each other, the more points and hence increased calculation resolution and fidelity is available to evaluate of plot as shown in FIG. 4.

This information stored in Table 1 as □A(f(x))□ and shown graphically in FIG. 4 is used to determine an amplitude ripple. The amplitude ripple is shown graphically as the difference in amplitude between the high and low amplitudes for the test signals relative to a reference point. The reference point here is shown at □A(f(x))□ equals zero. Alternatively, the amplitude ripple may be based upon values that are not relative to a reference point, but absolute estimations of amplitude or power. This amplitude ripple approximates the amplitude distortion component of the channel distortion of the communications medium 204. Thus, the amplitude distortion estimator 222 estimates the amplitude distortion of the communications medium 204 having the given bandwidth 102 as an amplitude ripple between the stored powers of the test signals (Step 524 of FIG. 5). This amplitude ripple, which represents the amplitude distortion of the communications medium 204 is then stored and sent to the system controller/reporting subsystem 226 as output 242.

Referring again back to FIG. 2, since the system controller/reporting subsystem 226 has knowledge of the individual phase distortion and amplitude distortion components, the system controller/reporting subsystem 226 now has an estimate of the transfer function $H_1(\omega)$ of the communications medium 204. Advantageously, knowing the transfer function of the particular communications medium 204, the system controller/reporting subsystem 226 utilizes known signal processing simulations, such as "System View by Elanix" or "SPW" as described above to make quantitative decisions about the particular communications medium's 204 ability to support various grades of signaling, i.e. various combinations of signaling rates and modulation levels. Thus, it may be determined whether the communications medium 204 having a given bandwidth 102 will support signaling at a particular modulation level and signaling rate (Step 526 of FIG. 5).

The phase distortion estimator 224 and the amplitude distortion estimator 222, together the channel distortion estimator 220, are shown as separate blocks, although steps performed may be performed within the system controller/reporting subsystem 226. Thus, the phase distortion estimator 224 and the amplitude distortion estimator 222 may be implemented as separate from or a part of the system controller/reporting subsystem 226. As such, the phase distortion estimator 224 and the amplitude distortion estimator 222 may be a part of the receiver 206, at the same location as the receiver 206 or otherwise coupled to the receiver 206, either directly or through another communications medium. Similarly, the system controller/reporting subsystem 226 may be a part of the receiver 206, at the same location as the receiver 206 or may be coupled to the receiver 206. In other embodiments, the system controller/reporting subsystem may be located at the transmitter 202.

Advantageously, in this embodiment of the present invention, the system of FIG. 2 provides an "in-system" solution that can evaluate the viability of a particular communications medium 204 to support various combinations of modulation levels and signaling rates without actually connecting dedicated equipment to the communications medium 204 that transmits and receives signaling at the desired modulation level and signaling rate. This dedicated equipment that is conventionally required to test the communications medium 204 is either a transmitter and receiver that operate at the desired modulation level and signaling rate or adaptive transmitters and receivers that can switch between multiple signaling rates and modulation levels.

Furthermore, in contrast to network analyzers, this embodiment of the present invention does not require dedicated equipment, such as the two-port network analyzer, to be connected to the transmit end and the receive end of the communications medium 204. The use of the network analyzer would result in the complete interruption of any existing services, since the communications medium 204 could not be used at all for the duration of the testing. In contrast, this embodiment of the present invention may be used while at the same time sharing the communications medium 204 with an existing service and not degrading the existing services throughput.

Additionally, although a network analyzer transmits test signals over spectral portions of the communications medium 204, the network analyzer analyzes the received sine wave of the test signal and compares it to the transmitted sine wave over time to estimate the amplitude and phase distortion. In contrast, this embodiment of the present invention simply uses the conventionally generated equalizer coefficients and power measurements from conventional autocorrelators or FFTs (or other means to estimate the power or amplitude of a signal as described above) for each test signal to estimate time locations of the dominant channel distortions and power measurements for each test signal, which are collectively used to estimate the amplitude and phase distortion. Thus, an in-system solution is provided, in contrast to the network analyzer, which is an obtrusive, time involved, out-of-service system solution.

Furthermore, in many systems, such as in the embodiment described with reference to FIG. 6, there is typically a considerable distance of many miles between the transmitter 202 and the receiver 206, which makes it impractical to make wireline connections from the network analyzer to both the transmitter 202 and receiver 206. Again, in contrast, this embodiment of the present invention, does not require dedicated equipment to be connected to the communications medium and is entirely an in-system solution.

Furthermore, the techniques performed in this embodiment of the present invention advantageously allow the determination of the transfer function of the communications medium 204 using fixed signaling rate and modulation level transmitters and receivers. The conventional methods of testing a communications medium 204 do not provide an estimate of the amplitude and phase distortion (i.e. the transfer function) of the communications medium 204. These conventional methods simply send test signals at the desired signaling rate and modulation level that occupy the entire bandwidth of the medium to determine if the communications medium will support signaling using the particular modulation level and signaling rate of the test signal.

In contrast, using an existing transmitter 202 and receiver 206 already connected to and using the communications medium 204, this embodiment provides an estimate of the amplitude and phase distortion of the communications medium 204, i.e. the transfer function of the communications medium 204. This transfer function is then used to determine if the communications medium 204 will support signaling at any combination of a signaling rate and a modulation level. Thus, advantageously, the existing equipment can be used to determine what levels of service, i.e. what signaling rates and modulation levels, are supportable by the particular communications medium 204. Thus, enabling the most efficient use of the communications medium 204 to be determined. Again, in this embodiment, alternative dedicated equipment which would interrupt an existing service if connected to the communications medium 204, is not required.

Furthermore, such techniques may be used to evaluate different spectral slices of the communications medium 204 in order to determine where optimum portions of the spectra of the communications medium 204 may lie. If an existing service is within the communications medium 204, the communications medium 204 may be evaluated to see if the communications system will be able to support a higher level service. Again, this is performed without the need to connect additional dedicated equipment that would interrupt the existing service.

It is noted that the system of FIG. 2 may be implemented to include a program storage device readable by a machine, tangibly embodying a program of instructions executable by the machine to perform the method steps of estimating the phase distortion and the amplitude distortion of the communications medium 204, specifically Steps 510–518 and Steps 522–524 of FIG. 5. The phase distortion estimator 224 and the amplitude distortion estimator 222 may be implemented according to such a program of instructions, and the machine may include the transmitter 202 and the receiver 206. To allow the machine to execute the program of instructions, the machine may include a processor, such as a microprocessor or other logic circuitry capable of executing the program of instructions. The phase distortion estimator 224 and the amplitude distortion estimator 222, the system controller/reporting subsystem 226, as well as the machine as a whole, may be implemented using either hardware, software, or a combination thereof, for example using a general purpose microprocessor, a microcontroller, and/or application specific logic circuits, and software and/or firmware cooperatively related to them.

Figure 6:
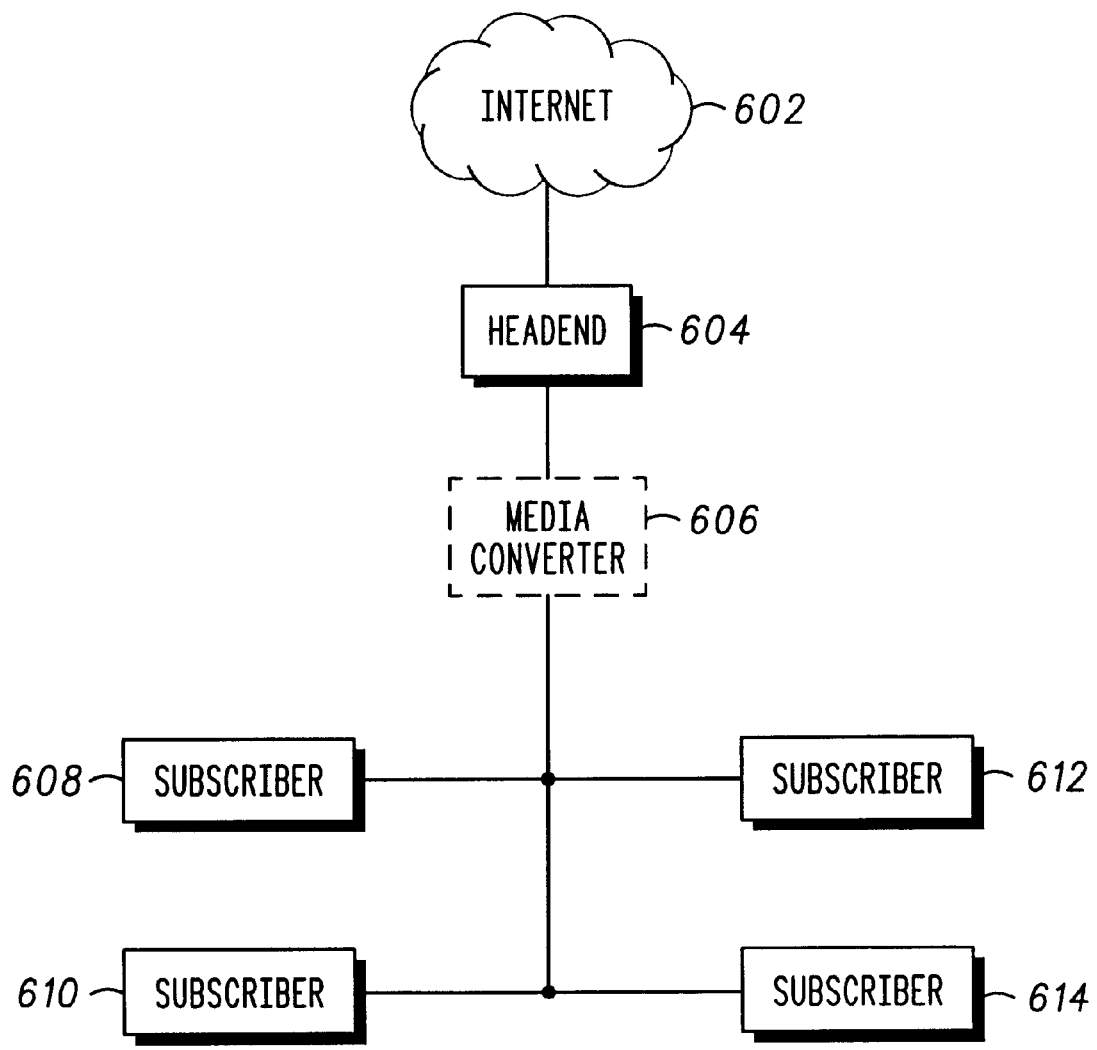
FIG. 6 is a block diagram of one embodiment of the present invention illustrating a relatively time-invariant communications network in which the techniques and structure of FIGS. 1–5 may be used to estimate amplitude distortion and phase distortion, and in accordance with another embodiment of the present invention, an amplitude distortion and a phase distortion may be localized to a particular subscriber or portion of the network.

Referring next to FIG. 6, a block diagram is shown of one embodiment of the present invention illustrating a relatively time-invariant communications network in which the techniques and structure of FIGS. 1–5 may be used to estimate amplitude distortion and phase distortion, and in accordance with another embodiment of the present invention, an amplitude distortion and a phase distortion may be localized to a particular subscriber or portion of the network. The network 600 comprises an internet 602, headend 604, media converter 606, and subscribers 608, 610, 612 and 614. While subscribers 608, 610, 612, and 614 are illustrated, it is understood that the network 600 may include any number of subscribers. Internet 602 may be any information network, for example a global information network. Internet 602 is coupled to the headend 604. The headend 604 communicates with the internet 602 and with subscribers 608, 610 612 and 614. The headend 604 is coupled to the media converter 606. The media converter 606 is coupled to subscribers 608, 610 612 and 614. Communications between the headend 604 and the subscribers 608, 610, 612 and 614 is effected by the media converter 606.

For example, in a hybrid fiber/coax (HFC) cable system, a fiber optic cable supports communications between the headend 604 and the media converter 606, and coaxial cable supports communications between the media converter 606 and subscribers 608, 610, 612 and 614. The media converter 606 converts the media over which the communication occurs. For example, in a HFC system, the media converter 606 passes signals between the fiber optic cable and the coaxial cable. However, the media converter 606 may be unnecessary if a continuous medium is used between the headend 604 and the subscribers 608, 610, 612 and 614. Any suitable medium or media may be used between the headend 604 and the subscribers 608, 610, 612 and 614. For example, besides fiber optic cable and coaxial cable other media such as twisted pair cable, wireless, or satellite communications links may be used. Use in conjunction with relatively time-invariant media, such as a those having fixed positions of a transmitter and receiver, yield especially meaningful results.

In practice, the embodiments of the present invention as described with reference to FIGS. 1–5 above, may be incorporated into the network 600 of FIG. 6. For example, the transmitter 202 of FIG. 2 may be embodied in a cable modem located at the a respective one of subscribers 608, 610, 612 and 614, while the receiver 206 of FIG. 2 may be embodied in the cable modem termination system located within the headend 604. Thus, the above described test signals are sent upstream over an upstream communications medium to be evaluated from the respective one of the subscribers 608, 610, 612 and 614 to a receiver in the cable termination system of the headend 604. For example, an upstream communications medium in an HFC system may occupy a bandwidth between 5 MHz and 42 MHz. These test signals will be used to evaluate the particular communications medium's viability to support signaling at a desired modulation level and signaling rate. The system controller/reporting subsystem 226 of FIG. 2, which may be located at the headend 604 typically instructs the transmitter, via messages sent over the downstream communications medium, to transmit the test signals and also at what portion (or narrowband slice) of the communications medium to transmit the test signals. Alternatively, the transmitter may simply be instructed to transmit test signals at a predetermined time interval while incrementing subsequent test signals in frequency.

In a variation, the downstream communications medium may be evaluated by embodying the transmitter at the headend 604 and the receiver at one or more of the subscribers 608, 610, 612 and 614. Thus, test signals are transmitted downstream over a communications medium to be evaluated to the subscribers 608, 610, 612 and 614. For example, a downstream communications medium in an HFC system may comprise a bandwidth between 90 MHz and 860 MHz.

Further advantageously, the transmission of the test signaling is implemented such that any existing services being sent over the communications medium to be eveluated is not interrupted. As described above, either the existing service is temporarily relocated within the communications medium, temporarily suspended, or the test signals (e.g. either PRBS or data carrying signals) are time-multiplexed in with the existing service at different signaling or data rates (i.e. the HFC system can communicate at multiple rates and remain within protocol). As such, additional testing equipment, as is conventionally known, does not need to be connected to the communications medium. Thus, applying the embodiments and processes described in FIGS. 1–5, provides an in-system.solution to estimating amplitude and phase distortion of a given communications medium.

In another embodiment of the present invention, a channel distortion may be "localized" to a particular subscriber. For example, if the transmitter 202 of FIG. 2 is embodied at cable modems located at each of the subscribers 608, 610, 612 and 614, and the receiver 206 of FIG. 2 is embodied at the cable termination system in the headend 604, then test signals are transmitted from each subscriber 608, 610, 612 and 614 to the headend 604 over the upstream communications medium. Both the phase distortion estimator and the amplitude distortion estimator within the headend 604 will receive information identifying the particular transmitter (at the particular subscriber) that the test signal was transmitted from. This information is gathered by the receiver since the receiver is time synchronized with the transmitter at each subscriber; thus, the receiver knows the originating transmitter for each test signal received. Furthermore, each received test signal itself will typically contain header information, e.g. in a preamble, that contains transmitter identification which identifies the originating transmitter to the receiver. Furthermore, information such as internet protocol (IP) or an ethernet address may also be used.

Thus, advantageously, since both the phase distortion estimator and the amplitude distortion estimator can access the transmitter identification for each of the received test signals, the phase distortion estimator and the amplitude distortion estimator store estimates of the time locations □T(f(x))□ and powers □A(f(x))□ separately and specific to each transmitter. For example, a separate table similar to Table 1 shown above, may be generated for test signals from each transmitter; and thus, specific to each subscriber. As such, separate plots, as shown in FIGS. 3 and 4 may be created specific to each transmitter, i.e. subscriber 608, 610, 612, and 614. Likewise, an estimate of the phase distortion and amplitude distortion, i.e. the transfer function, of the communications medium may be determined that is specific to each transmitter at each subscriber 608, 610, 612, and 614.

Thus, advantageously, a level of channel distortion may be estimated specific to the upstream communications medium from each of the subscribers 608, 610, 612 and 614 to the headend 604. In other words, a channel distortion may be localized to a specific subscriber. For example, if the channel distortion of the upstream communications medium between subscriber 608 to the headend 604 was significantly more pronounced than the related channel distortion estimates relative to the other subscribers 610, 612 and 624 to the headend 604, then this may indicate a problem exists in the communications path between subscriber 608 and the headend 604. Furthermore, this may be indicative, for example, of equipment located at subscriber 608 that is not functioning properly or that another source is causing increased microreflections of the signaling. As such, the localized channel distortion estimate may indicate whether the communications medium between a particular subscriber 608, 610, 612 and 614 and the headend 604, for example, may not be functioning properly, has been tampered with, or otherwise requires investigation as to the source of the pronounced channel distortion.

Again, the techniques of estimating a channel distortion level localized to or specific to a certain subscriber may be implemented in the system controller/reporting subsystem or other microprocessor.

While the invention herein disclosed has been described by means of specific embodiments and applications thereof, numerous modifications and variations could be made thereto by those skilled in the art without departing from the scope of the invention set forth in the claims.

What is claimed is:

1. A method of estimating distortion of a communications medium having a given bandwidth comprising:

receiving a plurality of test signals from the communications medium, wherein each of the plurality of test signals has a test bandwidth that is a fraction of the given bandwidth, wherein each of the plurality of test signals occupies a different portion of the given bandwidth;

processing each of the plurality of test signals with an equalizer;

evaluating equalizer coefficients for each of the plurality of test signals to determine a time when a dominant channel distortion occurs; and determining a differential group delay based upon the time determined for each of the plurality of test signals, wherein the differential group delay approximates a phase distortion of the communications medium.

2. The method of claim 1 further comprising:

determining a power of said each of said plurality of test signals; and determining an amplitude ripple by evaluating the power determined for said each of said plurality of test signals, whereby the amplitude ripple approximates an amplitude distortion of said communications medium.

3. The method of claim 2 wherein said amplitude distortion and said phase distortion represent a transfer function of said communications medium.

4. The method of claim 3 further comprising:

predicting, based upon said transfer function, whether a given modulation level and a given signaling rate are supportable by said communications medium having said given bandwidth.

5. The method of claim 1 further comprising transmitting said each of said plurality of test signals through said communications medium.

6. The method of claim 1 wherein a ratio of said test bandwidth at most 20% of said given bandwidth.

7. The method of claim 1 further comprising moving an existing service having a service bandwidth that occupies a portion of said given bandwidth in frequency, in the event a respective one of said plurality of test signals will occupy a same portion of said given bandwidth as said existing service, such that the respective one of said plurality of test signals does not interrupt said existing service.

8. The method of claim 1 further comprising multiplexing a respective one of said plurality of test signals in time with an existing service having a service bandwidth that occupies a portion of said given bandwidth, in the event a respective one of said plurality of test signals occupies a same portion of said given bandwidth as said existing service.

9. The method of claim 8 wherein the respective ones of said plurality of test signals are transmitted at a different signaling rate than the existing service.

10. The method of claim 1 further comprising:
obtaining transmitter identification information for each of said plurality of test signals;
wherein said determining comprises determining said differential group delay based upon the time determined for respective ones of said plurality of test signals, the respective ones of said plurality of test signals having been transmitted by a respective transmitter identified by the transmitter identification information, wherein said differential group delay approximates said phase distortion of said communications medium specific to the respective transmitter.

11. The method of claim 1 wherein one or more of the plurality of test signals are data carrying test signals.

12. A method of estimating distortion of a communications medium having a given bandwidth comprising:
receiving a plurality of test signals, wherein each of the plurality of test signals has a test bandwidth that is a fraction of the given bandwidth, wherein each of the test signals occupies a different portion of the given bandwidth;
determining a power of each of the plurality of test signals; and
determining an amplitude ripple by evaluating the power of each of the plurality of test signals, wherein the amplitude ripple approximates an amplitude distortion of the communications medium having the given bandwidth.

13. The method of claim 12 wherein said determining said power comprises determining said power using an autocorrelator or a fast Fourier transform.

14. The method of claim 12 further comprising:
processing said each of said plurality of test signals with an equalizer;
evaluating equalizer coefficients for said each of said plurality of test signals to determine a time when a dominant channel distortion occurs; and
determining a differential group delay based upon the time determined for said each of said plurality of test signals, wherein the differential group delay approximates a phase distortion of said communications medium.

15. The method of claim 12 further comprising:
obtaining transmitter identification information for each of said plurality of test signals;
wherein said determining said amplitude ripple comprises determining said amplitude ripple by evaluating the power of respective ones of said plurality of test signals, the respective ones of said plurality of test signals having been transmitted by a respective transmitter identified by the transmitter identification information, wherein said amplitude ripple approximates said amplitude distortion of said communications medium specific to the respective transmitter.

16. A method comprising:
estimating a time when a dominant channel distortion occurs for each of a plurality of received test signals, wherein each of the plurality of received test signals occupies a different position in frequency in a communications medium having a given bandwidth;
determining a differential group delay for the times estimated for each of the plurality of received test signals; and
approximating a phase distortion of the communications medium as the differential group delay.

17. The method of claim 16 further comprising:
estimating a power of said each of said plurality of received test signals;
determining an amplitude ripple by evaluating the power of said each of said plurality of received test signals; and
approximating an amplitude distortion of said communications medium as the amplitude ripple.

18. The method of claim 17 wherein said amplitude distortion and said phase distortion represent a transfer function of said communications medium.

19. The method of claim 18 further comprising:
predicting, based upon said transfer function, whether a given modulation level and a given signaling rate are supportable by said communications medium having said given bandwidth.

20. The method of claim 16 further comprising:
obtaining transmitter identification information for each of said plurality of received test signals;
wherein said determining comprises determining said differential group delay based upon the time determined for respective ones of said plurality of received test signals, the respective ones of said plurality of received test signals having been transmitted by a respective transmitter identified by the transmitter identification information; and
wherein said approximating comprises approximating said phase distortion of said communications medium specific to the respective transmitter as said differential group delay.

21. The method of claim 16 wherein one or more of the plurality of received test signals are data carrying test signals.

22. A method comprising:
estimating a power of each of a plurality of received test signals, wherein each of the plurality of received test signals occupies a different position in frequency in a communications medium having a given bandwidth;
determining an amplitude ripple by evaluating the power estimated for each of the plurality of received test signals; and
approximating an amplitude distortion of the communications medium as the amplitude ripple.

23. The method of claim 22 further comprising:
obtaining transmitter identification information for each of said plurality of received test signals;
wherein said determining comprises determining said amplitude ripple by evaluating said power estimated for respective ones of said plurality of received test signals, the respective ones of said plurality of received test signals having been transmitted by a respective transmitter identified by the transmitter identification information; and
wherein said approximating comprises approximating said amplitude distortion of said communications medium specific to the respective transmitter as said amplitude ripple.

24. A system for estimating distortion of a communications medium having a given bandwidth comprising:
a demodulator receiving a plurality of test signals, wherein each of the plurality of test signals has a test bandwidth that is a fraction of the given bandwidth, wherein each of the plurality of test signals occupies a different portion of the given bandwidth;
a signal conditioner coupled to the demodulator;

an equalizer coupled to the signal conditioner;

a phase distortion estimator coupled to the equalizer, wherein the phase distortion estimator evaluates equalizer coefficients for each of the plurality of test signals to determine a time when a dominant channel distortion occurs and determines a differential group delay based upon the time for each of the plurality of test signals, wherein the differential group delay approximates a phase distortion of the communications medium.

25. The system of claim 24 further comprising:

means to determine the power of each of said plurality of test signals coupled to the signal conditioner;

an amplitude distortion estimator coupled to the means, wherein the amplitude distortion estimator determines an amplitude ripple by evaluating the power of each of the plurality of test signals, wherein the amplitude ripple approximates an amplitude distortion of the communications medium.

26. The system of claim 24 wherein said phase distortion estimator evaluates said equalizer coefficients for respective ones of said plurality of test signals, wherein the respective ones of said plurality of test signals have been transmitted from a respective transmitter, determines said time when said dominant channel distortion occurs and determines said differential group delay based upon said time for the respective ones of said plurality of test signals, wherein said differential group delay approximates said phase distortion of the communications medium specific to the respective transmitter.

27. A system for estimating distortion of a communications medium having a given bandwidth comprising:

a demodulator receiving a plurality of test signals, wherein each of the plurality of test signals has a test bandwidth that is a fraction of the given bandwidth, wherein each of the plurality of test signals occupies a different portion of the given bandwidth;

a signal conditioner coupled to the demodulator;

means to determine the power of each of the plurality of test signals coupled to the signal conditioner;

an amplitude distortion estimator coupled to the means, wherein the amplitude distortion estimator determines an amplitude ripple by evaluating the power of each of the plurality of test signals, wherein the amplitude ripple approximates an amplitude distortion of the communications medium.

28. The system of claim 27 further comprising:

an equalizer coupled to said signal conditioner;

a phase distortion estimator coupled to the equalizer, wherein the phase distortion estimator evaluates equalizer coefficients for said each of said plurality of test signals to determine a time when a dominant channel distortion occurs and determines a differential group delay based upon the time for said each of said plurality of test signals, wherein the differential group delay approximates a phase distortion of said communications medium.

29. The system of claim 27 wherein said amplitude distortion estimator determines said amplitude ripple by evaluating said power of respective ones of said plurality of test signals, wherein the respective ones of said plurality of test signals have been transmitted from a respective transmitter, wherein said amplitude ripple approximates said amplitude distortion of said communications medium specific to the respective transmitter.

30. A method of non-obtrusively estimating distortion of a communications medium having a given bandwidth that transmits an existing service occupying a portion of the given bandwdith comprising:

receiving one or more test signals from the communications medium, wherein the one or more test signals are multiplexed with the existing service, wherein respective ones of the one or more test signals carry data for the existing service; and estimating the distortion of the communications medium by analyzing the one or more test signals, wherein the existing service is not interrupted.

31. The method of claim 30 wherein the receiving step comprises receiving the one or more test signals at a different rate than the existing service.

32. The method of claim 30 wherein each of the one or more test signals has a test bandwidth that is a fraction of the given bandwidth, wherein each of the one or more test signals occupies a different portion of the given bandwidth.

33. The method of claim 32 wherein each of the one or more test signals has a test bandwidth that is smaller than a service bandwidth of the existing service.

* * * * *